US006155752A

United States Patent [19]

Buhlmann

[11] Patent Number: 6,155,752

[45] Date of Patent: Dec. 5, 2000

[54] POWDER SPRAY COATING EQUIPMENT

[75] Inventor: Eugen Thomas Buhlmann, Gossau, Switzerland

[73] Assignee: ITW Gema AG, Schweiz, Switzerland

[21] Appl. No.: 09/185,595

[22] Filed: Nov. 4, 1998

[30] Foreign Application Priority Data

Nov. 5, 1997 [DE] Germany ............................ 197 48 821

[51] Int. Cl.[7] ............................ B65G 51/18; B65G 53/52

[52] U.S. Cl. ............................ 406/181; 406/85; 406/141; 406/194; 222/630; 118/308; 417/187; 239/61

[58] Field of Search .................................... 406/1, 50, 52, 406/85, 141, 181, 183, 194; 118/308; 222/630; 239/61, 79, 85; 417/187, 174

[56] References Cited

U.S. PATENT DOCUMENTS

| | | | |
|---|---|---|---|
| 3,625,404 | 12/1971 | Probst . | |
| 4,284,032 | 8/1981 | Moos et al. | 118/308 |
| 5,131,350 | 7/1992 | Buschor | 118/308 |
| 5,356,577 | 10/1994 | Boldis et al. | 406/181 |

FOREIGN PATENT DOCUMENTS

| | | | |
|---|---|---|---|
| 214844 | 3/1987 | European Pat. Off. | 406/52 |
| 0 412 289 | 2/1991 | European Pat. Off. . | |
| 2 026 498 | 12/1970 | Germany . | |
| 35 28 749 | 2/1987 | Germany . | |
| 42 42 225 | 2/1994 | Germany . | |
| 44 09 493 | 9/1994 | Germany . | |
| 43 25 044 | 2/1995 | Germany . | |
| 295 18 478 | 2/1996 | Germany . | |
| 195 48 607 | 6/1997 | Germany . | |

*Primary Examiner*—Christopher P. Ellis
*Assistant Examiner*—Joe Dillon, Jr.
*Attorney, Agent, or Firm*—Lowe Hauptman Gopstein Gilman & Berner LLP

[57] ABSTRACT

The invention concerns powder spray coating equipment comprising an air divider (16) to adjustably divide a total-air flow (6, 14) into a conveying-air flow (54, 57, 70) and a supplemental-air flow (56, 84, 86) in such manner that, when adjusting for a larger flow of conveying air, the flow of supplemental air shall be reduced in a predetermined ratio, and vice versa; further comprising an injector (76) to aspirate and to pneumatically convey coating powder by means of the flow of conveying air; and a supplemental-air intake (89) into the air/powder path (76, 82). The conveying-air path (54, 57, 70) and the supplemental-air path (56, 84, 86) each are fitted with at least one throttling duct each constituted by at least one channel (40, 42) in a rotatable shaft (34, 36) and by a bearing surface (39) covering the channel. The channels (40, 42) run in the circumferential shaft direction and their cross-section decreases monotonely from a channel beginning (41, 43) as far as a channel end (45, 47) whereby, together with the bearing surface (39) they form an increasingly larger flow impedance. The total-air path (6, 12, 14) communicates with the channel beginnings (41, 43). A conveying-air discharge aperture (54) is present in the bearing surface (39) above the channel (40) of the conveying-air path, and a supplemental-air discharge aperture (56) is present above the channel (42) of the supplemental-air path in the bearing surface (39), said discharge apertures running only over a very short segment of the the length of the channels.

11 Claims, 2 Drawing Sheets

POWDER SPRAY COATING EQUIPMENT

Figure 1:
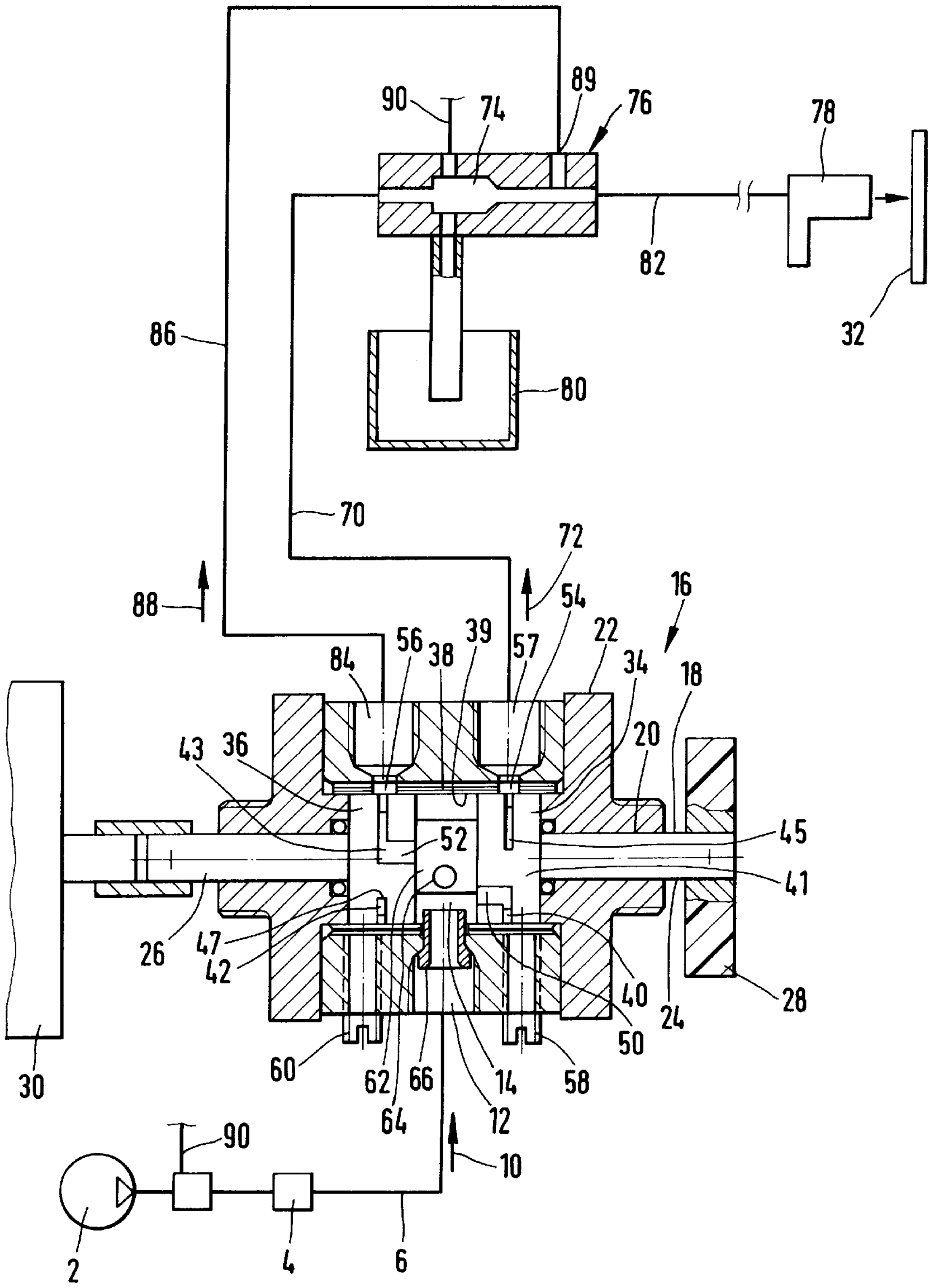

The invention relates to a powder spray coating equipment as defined in the preamble of claim 1.

Such powder spray coating equipment is known from the German patent document DE 44 09 493 A1. It contains an air divider to adjustably divide a total air flow into a conveying air flow and a supplemental air flow, so that, when setting a larger flow of conveying air, the supplemental air flow shall decrease in a given ratio, and vice-versa. The known air divided comprises a housing with a through-borehole wherein two offsets, each pointing outward, together with two valve housings, constitute two valves. The two valve cases are linked to each other by a valve rod in such manner that when one valve is being opened, the other shall be closing. One valve thereby controls the conveying air flow and the other valve the flow of supplemental air. The sum of the two air flows moves from a distributor chamber formed in the air divider housing in the intermediate space between the two valves through an annular gap between the wall of the through-borehole and the valve rod to the two valve seats. An intake for the total air flow into the distributor chamber is mounted on one side of, and radially to, the valve rod and the two outlets for the conveying air flow and supplemental air flow are configured radially to the valve rod on the radially opposite side. Together with their valve rod, the two valve cases can be axially adjusted relative to the valve seats by using a manual adjusting wheel at one axial end of the valve rod or using an electrical adjusting member at the other end of the valve rod. Powder spray coating equipment with an air divider of this kind furthermore is known from the U.S. Pat. No. 3,625,404. Conventionally an injector is used to pneumatically convey powder, the conveying air flow aspirating powder by the venturi principle in a partial-vacuum zone, hereafter vacuum zone, of the injector and then conveys this powder through an air/powder path, typically a hose, to a spray device, for instance a spray gun or a rotary atomizer. A high conveying air flow generates a deep vacuum and thus conveys much powder. A low conveying air flow conveys only little powder. To preclude pulses and powder deposits in the air/powder path, the flows of the known system must be at a speed of at least 10 m/s. As a consequence, if only little powder is to be conveyed to an object to be coated, the required conveying air no longer suffices to generate the said minimum speed. On the other hand powder must not impinge with excessive air and at excessive speed an object to be coated, as in such a case the powder particles will recoil from the object and/or the powder particles adhering to the object will be blown away by the air. Therefore the flow speeds in the air/powder path shall be in the range of 10–20 m/s.

The invention solves the problem of improving the efficiency and quality of powder coating by making possible finer control of minute changes in the flows of conveying air and supplemental air as well as of their ratio.

This problem is solved in the invention by the features of claim 1.

Further features of the invention are stated in the dependent claims.

The invention is elucidated below by an illustrative embodiment and in relation to the drawings.

Figure 2:
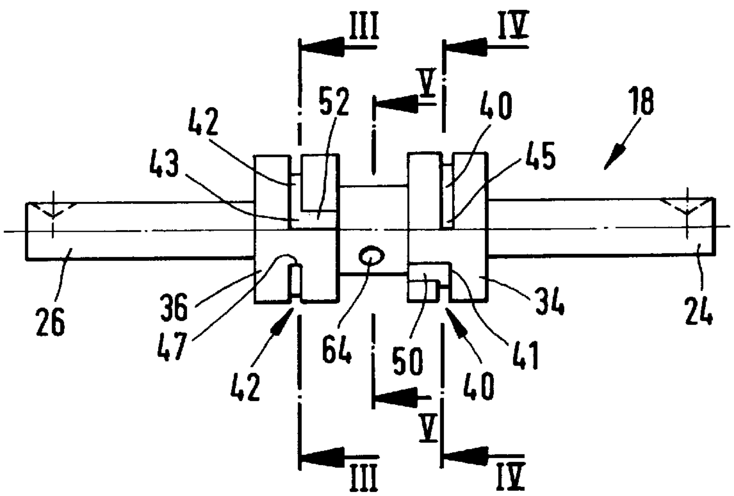
Figure 3:
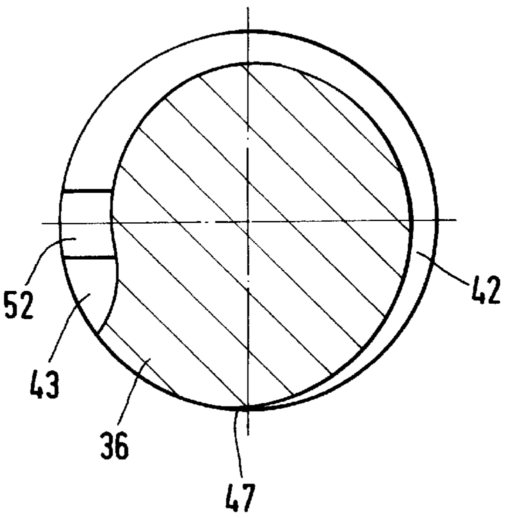
Figure 4:
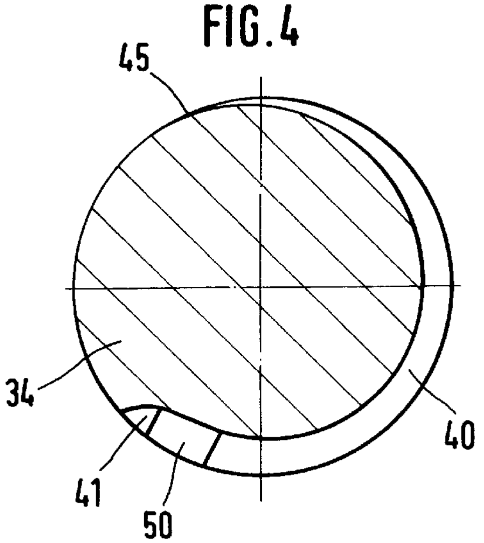
Figure 5:
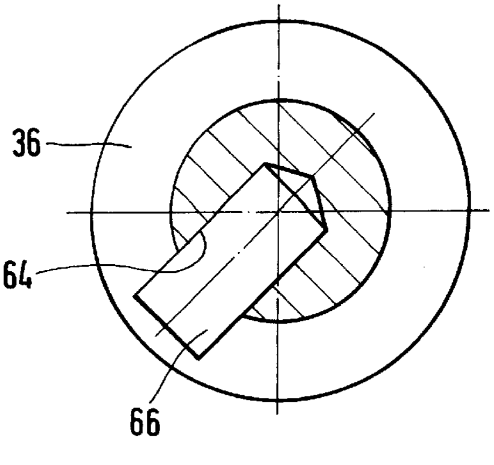

FIG. 1 is a schematic and partly axial view, not to scale, of powder spray coating equipment of the invention, FIG. 2 is a sideview of an air divider shaft of FIG. 1, FIG. 3 is an enlarged cross-section along the plane III—III of FIG. 2, FIG. 4 is a similarly enlarged cross-section along the plane IV—IV of FIG. 2, and FIG. 5 is a similarly enlarged cross-section along the plane V—V of FIG. 2.

FIG. 1 shows a source of compressed air 2 from which compressed air flows through a pressure regulator 4 at regulated pressure through a main air supply line 6 in the direction of an arrow 10 through a main air intake 12 into a distributor chamber 14 of an air divider 16. The distributor chamber 14 is formed by an annular channel in an air divider shaft 18. The air divider shaft 18 runs through a continuous borehole 20 of a bearing case 22 and to projects by both shaft end segments 24 and 26 from said housing. A handwheel 28 is mounted at one projecting shaft end segment 24 and a motor drive 30, for instance an electric motor with a reducing gear, is mounted at the other end 26, allowing selectively driving the air divider shaft 18 as a function of a desired time rate of conveying air or powder, manually by the handwheel 28 or automatically by the electric motor drive 30 for instance using an electronic or computerized control unit as a function of a computers program and/or of the objects 32 to be coated.

The circumferential channel forming the distributor chamber 14 is bounded on each side by an annular collar 34 and 36 of the air divider shaft 18, said collars resting rotatably in a bearing shell 38 received in the through-aperture 20 of the bearing case 22. At least one channel 40, 42 running circumferentially in a radial plane is present in each annular collar 34, 36 resp., each of said channels having a continuously decreasing diameter, preferably a continuously decreasing depth at constant channel width from a channel beginning 41, 43 to a channel end 45, 47 resp. The channels 40 and 42 are covered by the inner bearing surface 39 of the bearing shell 38 and thereby each channel jointly with the bearing surface 39 forms a flow impedance monotonely increasing from the beginning to the end of this channel. Each channel beginning 41, 43 communicates through an axially parallel communication channel 50, 52 resp. formed in the annular collars 34, 36 with the distributor chamber 14. A discharge aperture 54, 56 is formed by means of the channels 40, 42 resp. in the bearing shell 38 and runs only over a very short portion of the channel length and coincides depending on the rotary position of the distributor shaft 18 with different segments of the resp. channel 40, 42, whereby each channel 40, 42 forms a flow throttle of variable and finely adjustable flow impedance.

The channels 40, 42 run in opposite circumferential directions each from its channel beginning 41, 43 resp. to its channel end 45, 47. As a result, when rotating the air divider shaft 18, the air flow at one air discharge 54 shall be reduced when the air flow at the other discharge 56 is being increased, and vice-versa, namely in a ratio corresponding to the changing cross-sections of these channels. The channel cross-sections may vary unequally or preferably equally, in stepped manner or preferably continuously.

Adjusting screws 58, 60 are screwed into the bearing case 22 at diametrically opposite positions of the discharge apertures 54, 56 resp. and allow radially and hermetically forcing the bearing shell 38 in the vicinity of the discharge apertures 54, 56 against the bearing case 22 to preclude air leaks between the bearing shell 38 and the bearing case 22 in the zone of the discharge apertures 54, 56.

The shaft segment 62 bounding the distibutor chamber 14 and connecting the two annular collars 34, 38 to each other is fitted with a radial borehole 64 into which is inserted a stop pin 66 as shown in FIG. 5. The stop pin 66 impacts a bush 66 in both directions of rotation of the shaft, said bush being inserted into the total air intake 12, and said stop pin thereby limits the rotation of the air divider shaft 18 in both directions of rotation.

A hookup aperture 57 from which conveying air is moved through a conveying-air line 70 in the direction of the arrow 72 through the vacuum zone 74 of an injector 76 to a spray device 78 is aligned with the one air discharge aperture 54 of the bearing shell 38. In the vacuum zone 74, the conveying air aspirates coating powder out of a powder container 80 and conveys it through a hose 82 to the spray device 78 which sprays the powder onto the object 32 to be coated. The other air discharge 56 is connected through a hookup aperture 84 to a supplemental air line 86 and feeds supplemental air in the direction of an arrow 88 downstream of the vacuum zone 74 through a supplemental air intake 89 into the air/powder path formed by the hose 82 and the portion of the injector 76 located downstream of the vacuum zone 74. Preferably the supplemental air is fed inside the injector into the flow of conveying air and powder, though in another embodiment it also may be fed into the hose 82. Instead of being fed to the spray device 78, the powder also may be fed through the hose 82 to another implement, for instance a container or a precipitator.

Furthermore controlling air can be conveyed from the air source 2 through a controlling-air line 90 into the vacuum zone 74 of the injector 76 to reduce if desired the vacuum produced by the conveying air, for instance to shut off powder conveyance, without turning off the flow of conveying air when the spraying zone of the spray device 78 is devoid of an object 32.

The embodiments of the invention can be modified without thereby transcending the scope of the claims. Illustratively the distributor chamber 14, instead of being constituted by an annular channel in the air distributor shaft 18, may consist of an inner, circumferential channel in the case 22 axially interrupting the bearing shell 38, or each partly in both parts. Another possible modification is to divide the air divider shaft 18 into two shaft parts between the two shaft collars 34 and 36 in the vicinity of the distributor chamber 14. These two shaft pails may be irrotationally connected to each other or they may be independently rotatable, for instance in mutually opposite directions. In the case of opposite rotatabilities of the shaft parts, both shaft parts will be appropriately coupled to each other, either electrically or using electrical adjusting members, for instance adjusting motors, or mechanically using reversing gears. It follows that when the shaft parts are driven into mutually opposite directions of rotation, the channels 40 and 42 must run, not in opposite circumferential directions, but in the same circumferential directions, from their channel beginnings 41, 43 to their channel ends 45, 47 resp. in order that for one rotation of the shaft parts the supplemental air flow shall decrease in the desired ratio when the conveying air flow increases, and vice-versa. Another possible modification is to divide the distributor chamber 14 by a radial partition into axially adjacent chambers and to supply the total air from the total-air line 6 separately to each channel 40 and 42.

The magnitudes of the flow impedances of the throttling ducts formed by the channels 40 and 42 and their ratio depend on the flow impedances of the conveying air path and of the supplemental air path in the injector 76. Accordingly different air distributor shafts 18 are required for different injector shapes 76.

What is claimed is:

1. Powder spray coating equipment comprising:

an air divider (16) to adjustably divide a flow of total air of a total-air path (6, 14) into a flow of conveying air of a conveying-air path (54, 57, 70) and a flow of supplemental air of a supplemental-air path (56, 84, 86) in order that, when setting a larger conveyed conveying air flow, the supplemental air flow shall be reduced at a predetermined ratio, and vice-versa, an injector (76) with a partial-vacuum zone (74) operating on the venturi principle to aspirate and to pneumatically convey coating powder by means of the conveying air flow, an air/powder path (76, 82) through which the conveying air conveys the powder it has aspirated, a supplemental air intake (89) of the supplemental air path in the air/powder path (76, 82), characterized in that the air divider (16) comprises a shaft comprising two shaft pails (34, 36) rotatably supported in a bearing (38), the conveying air path (54, 57, 70) and the supplemental air path (56, 84, 86) each comprises at least one throttling duct formed each by at least one channel (40, 42) in one of the two shaft parts (34, 36) and a bearing surface (39) of the bearing (38) covering the channel, the channels (40, 42) run in the shaft's circumferential direction, each having a cross-section becoming monotonely smaller from a channel beginning (41, 43) to a channel end (45, 47), whereby these channels jointly with the bearing surface (39) form an increasingly larger flow impedance as the shaft rotates, the total-air path (6, 12, 14) is connected to the channel beginnings (41, 43), a discharge aperture (54) for the conveying air is present above the channel (40) of the conveying-air path in the bearing surface (39) and a discharge aperture (56) for the supplemental air is present above the channel (42) of the supplemental-air path in the bearing surface (39), each aperture running over a segment of the entire channel length and each aperture coinciding with different segments of the pertinent channel depending on the rotational position of the shaft parts (34, 36), whereby each channel constitutes a flow throttle with variably fine, adjustable flow impedance.

2. Powder spray coating equipment claim 1, characterized in that the width of the channels (40, 42) is constant over their length but that the depth decreases from the beginnings of the channels toward their ends.

3. Powder spray coating equipment claim 1, characterized in that the beating (38) comprises a bearing bush, in that at least one adjusting screw (58, 60) is provided to force the bearing bush (38) radially against a bearing case (22) in the vicinity of the conveying-air discharge aperture (54) and of the supplemental-air discharge aperture (56) in order to mutually hermetically connect a bearing shell and the bearing case around the discharge apertures (54, 56) and in that hookup apertures (57, 84) are formed in the case (22) which are aligned with the two apertures (54, 56).

4. Powder spray coating equipment claim 1, characterized in that stops (64, 66) to limit the rotational motion of the shaft parts (34, 36) are provided.

5. Powder spray coating equipment claim 1, characterized in that the total-air path (6, 12), the conveying-air path (54, 57, 70) and the supplemental-air path (56, 84, 86) each run transversely to the axis of rotation of the shaft parts (34, 36) into the air divider (16).

6. Powder spray coating equipment as claimed in claim 5, characterized in that one of the two shaft parts (34, 36) comprises a drive shaft segment (24) with a manual drive (28) and the other shaft part comprises a motor drive (30) and in that the manual drive (28) and the motor chive (30)

are mounted on the sides of the air divider (16) that face away from each other.

7. Powder spray coating equipment as claimed in claim 1, characterized in that the two shaft parts (34, 36) are connected to each other in such manner that they are always jointly rotatable in the direction of rotation and in that the channels (40, 42) of the two shaft parts run, in mutually opposite circumferential directions, from their channel beginning (41, 43) toward their channel end (45, 47).

8. Powder spray coating equipment as claimed in claim 7, characterized in that the shaft parts (34, 36) are mounted in mutually axial manner.

9. Powder spray coating equipment as claimed in claim 8, characterized in that the two shaft parts (34, 36) consist jointly of an integral shaft (18).

10. Powder spray coating equipment as claim 8, characterized in that the channels (40, 42) are spaced apart in the longitudinal shaft direction, in that a distributor chamber (14) is subtended in a gap zone and runs at least so far about the axis of rotation of the shaft pails (34, 36) as these shaft parts can be rotated to change the flow impedance of the conveying air and of the supplemental air, in that the channel beginnings (41, 43) communicate, through connecting channels (50, 52) formed in the longitudinal shaft-part direction in the shaft parts (34, 36), with the distributor chamber (14) and in that the total-air path (6, 12) is connected to the distributor chamber (14).

11. Powder spray coating equipment as claimed in claim 10, characterized in that the distributor chamber (14) consists of a circumferential channel formed between the shaft parts (34, 36).

* * * * *